US006942145B1

(12) United States Patent
Collins, Jr. et al.

(10) Patent No.: US 6,942,145 B1
(45) Date of Patent: Sep. 13, 2005

(54) CHECKOUT DEVICE WITH ENHANCED SECURITY LABEL DETECTION

(75) Inventors: Donald A. Collins, Jr., Atlanta, GA (US); Daniel B. Seevers, Lawrenceville, GA (US)

(73) Assignee: NCR Corporation, Dayton, OH (US)

( * ) Notice: Subject to any disclaimer, the term of this patent is extended or adjusted under 35 U.S.C. 154(b) by 33 days.

(21) Appl. No.: 10/459,015

(22) Filed: Jun. 11, 2003

(51) Int. Cl.[7] .............................................. G06K 15/00
(52) U.S. Cl. ................. 235/383; 235/380; 235/462.01; 235/462.15; 186/59; 186/61; 705/16
(58) Field of Search ........................... 235/383, 462.01, 235/462.13, 462.45, 462.46, 380; 340/572.1, 340/572.2, 572.3; 186/59, 61; 705/16

(56) References Cited

U.S. PATENT DOCUMENTS

| 5,469,142 | A | * | 11/1995 | Bergman et al. .......... 340/572.3 |
| 5,565,858 | A | * | 10/1996 | Guthrie ..................... 340/10.33 |
| 5,917,142 | A | * | 6/1999 | Chang ...................... 340/572.3 |
| 6,091,319 | A | * | 7/2000 | Black et al. ................ 340/10.2 |
| 6,111,507 | A | * | 8/2000 | Alicot et al. .............. 340/572.1 |
| 6,237,852 | B1 | * | 5/2001 | Svetal et al. ............ 235/462.43 |
| 6,488,207 | B1 | * | 12/2002 | Kawai et al. ................ 235/383 |
| 6,595,421 | B2 | * | 7/2003 | Detwiler ................. 235/462.14 |
| 6,607,125 | B1 | * | 8/2003 | Clouser et al. ............. 235/383 |
| 6,681,989 | B2 | * | 1/2004 | Bodin ........................ 235/383 |
| 6,715,677 | B1 | * | 4/2004 | Nugent, Jr. ................. 235/383 |
| 6,719,202 | B1 | * | 4/2004 | Kawai et al. ........... 235/462.13 |
| 6,783,072 | B2 | * | 8/2004 | Acosta et al. ........... 235/462.13 |
| 2003/0146280 | A1 | * | 8/2003 | Acosta et al. ................ 235/454 |
| 2003/0197611 | A1 | * | 10/2003 | Clifford et al. ........... 340/572.1 |

* cited by examiner

Primary Examiner—Ahshik Kim
(74) Attorney, Agent, or Firm—Paul W. Martin

(57) ABSTRACT

A checkout device with a barcode reader and electronic article surveillance (EAS) system. The checkout device includes a barcode reader having substantially horizontal and vertical apertures for reading barcode labels on products, and a security label sensing and deactivation system for deactivating security labels on the products including a coil below the horizontal aperture. The security label sensing and deactivation system has a first range of operation which is increased by the EAS system by increasing field strength of the coil, or by adding a second coil adjacent the vertical aperture. An audible or visible signaling device notifies an operator that the barcode labels have been read and that the security labels have been deactivated.

6 Claims, 7 Drawing Sheets

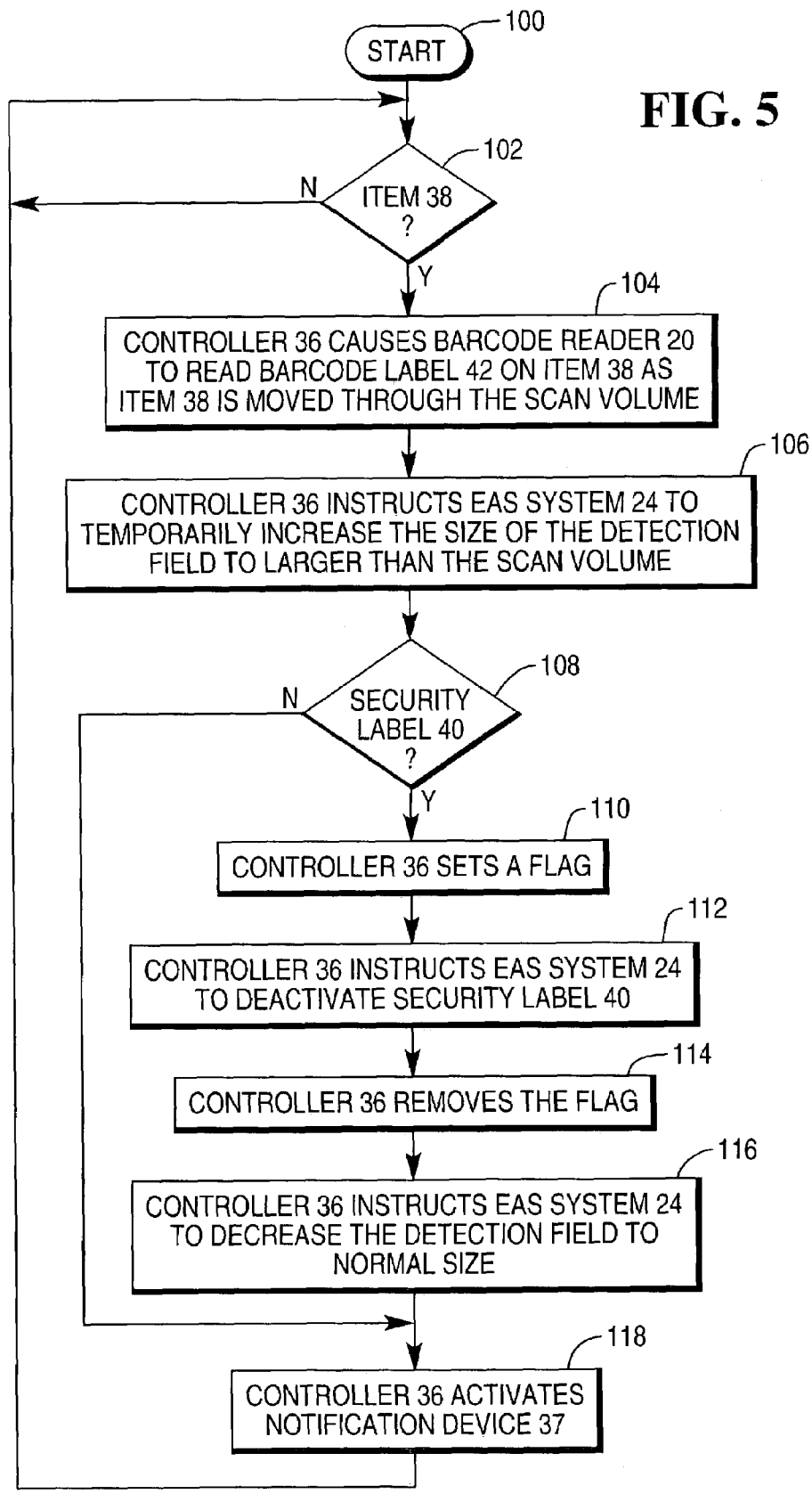

CHECKOUT DEVICE WITH ENHANCED SECURITY LABEL DETECTION

CROSS-REFERENCE TO RELATED APPLICATIONS

The present invention is related to the following commonly assigned co-pending U.S. applications filed therewith:

application Ser. No. 10/061,381, entitled "CHECKOUT DEVICE INCLUDING INTEGRATED BARCODE READER, SCALE AND EAS SYSTEM", having as inventors, Donald A. Collins, et al., filed Feb. 1, 2002; and application Ser. No. 10/185,302, entitled "CHECKOUT DEVICE INCLUDING INTEGRATED BARCODE READER AND EAS SYSTEM", having as inventors, Donald A. Collins, et al., filed Jun. 28, 2002.

BACKGROUND OF THE INVENTION

The present invention relates to product checkout devices and more specifically to a checkout device with enhanced security label detection.

An example of a checkout device that includes a barcode reader and an integrated electronic article surveillance (EAS) system and is illustrated in U.S. Pat. No. 5,059,951. This checkout device includes a single-aperture barcode reader.

One example of a checkout device is the NCR 7875 dual aperture barcode reader.

It would be desirable to combine an EAS system with a dual-aperture barcode reader in a way that enhances security label detection and deactivation.

SUMMARY OF THE INVENTION

In accordance with the teachings of the present invention, a checkout device with enhanced security label detection is provided.

The checkout device includes a barcode reader having substantially horizontal and vertical apertures for reading barcode labels on products, and a security label sensing and deactivation system for deactivating security labels on the products including a coil below the horizontal aperture. The security label sensing and deactivation system has a first range of operation which is increased by the EAS system by increasing field strength of the coil, or by adding a second coil adjacent the vertical aperture. An audible or visible signaling device notifies an operator that the barcode labels have been read and that the security labels have been deactivated.

It is accordingly an object of the present invention to provide a checkout device with enhanced security label detection.

It is another object of the present invention to provide a checkout device with enhanced security label detection that includes a dual-aperture barcode reader.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

FIG. 5 is a flow diagram illustrating a method of detecting and deactivating a security label in accordance with a second embodiment.

DETAILED DESCRIPTION OF THE PREFERRED EMBODIMENT

Figure 1:
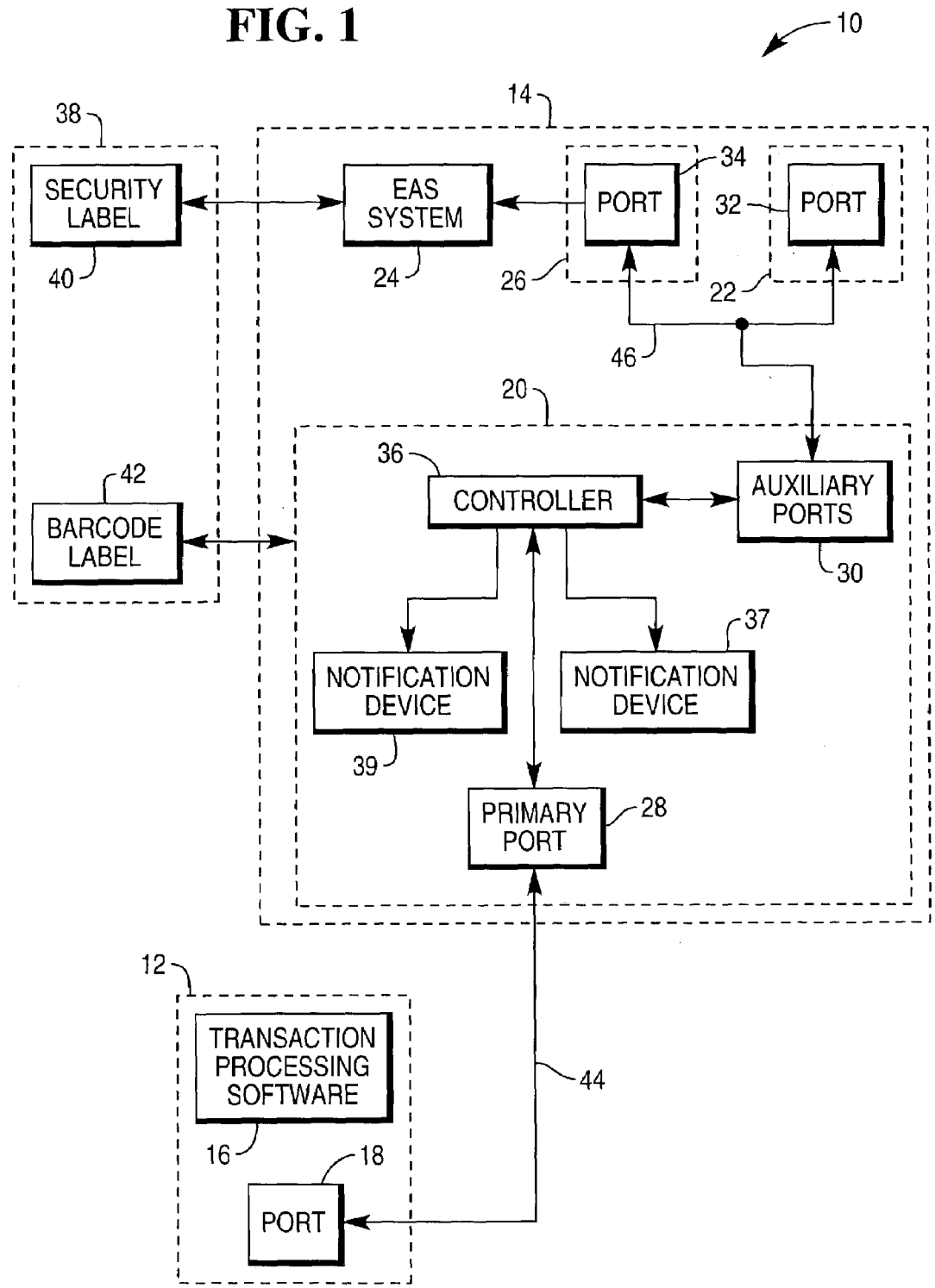
FIG. 1 is a block diagram of a checkout system.

Referring now to FIG. 1, checkout system 10 includes point-of-sale (POS) terminal 12 and checkout device 14.

POS terminal 12 executes transaction processing software 16, which records items 38 for purchase and records payment for items 38.

POS terminal 12 additionally includes port 18 to which checkout device 14 is connected. Port 18 may be a serial port, such as an RS232 serial port.

Checkout device 14 primarily includes barcode reader 20 and electronic article surveillance (EAS) system 24. Checkout device 14 may additionally include scale 22.

Barcode reader 20 reads barcode labels 42 on purchased items 38. Barcode reader 20 includes controller 36 which sends an enable signal to EAS system 24 through interlock 26 following reading of barcode label 42. Barcode reader 20 preferably includes primary port 28 for connection barcode reader 20 to port 18 of POS terminal 12. In addition, barcode reader 20 preferably includes auxiliary ports 30 to which other peripherals, such as scale 22 are connected. Primary and auxiliary ports 28 and 30 may be serial ports, such as RS232 serial ports.

Barcode reader 20 also include notification device 37 and 39. Notification device 37 includes a tone generator or light for notifying an operator that a barcode label 42 has been read or not read.

Notification device 39 includes a clicking noise generator for notifying an operator that EAS system 24 has detected security label 40. Notification device 39 may alternatively be part of EAS system 24 and controlled by EAS system 24.

Barcode reader 20 is a multi-aperture barcode reader, and may include an NCR model 7875 dual-aperture barcode reader. Barcode reader 20 may include integrated or separately housed horizontal and vertical barcode readers.

Scale 22 weighs purchased produce items.

EAS system 24 deactivates security labels 40 on purchased items 38 that have them. EAS system 24 senses the presence of security label 40 and deactivates security label 40. EAS system 24 may be connected to one of auxiliary ports 30 or to interlock 26. If present, interlock 26 activates EAS system 24 in response to an enable signal from controller 36 of barcode reader 20. Thus, interlock 26 signals EAS system 24 to detect security label 40 only if barcode reader 20 has read barcode label 42. EAS system 24 may include a Sensormatic EAS system.

POS terminal 12 and checkout device 14 may be coupled in various ways. In the illustrated example, cable 44 couples port 18 of POS terminal 12 to primary port 28 of barcode reader 20. Cable 46 couples one of auxiliary ports 30 of barcode reader 20 to port 32 of scale 22 and port 34 of interlock 26.

Under this example, cables 44 and 46 supply data. Cable 46 may additionally supply power to scale 22 from barcode reader 20.

Multiple power connections supply power. POS terminal 12 and barcode reader 20 have their own power connections. Interlock 26 and EAS system 24 share another power connection.

Figure 2:
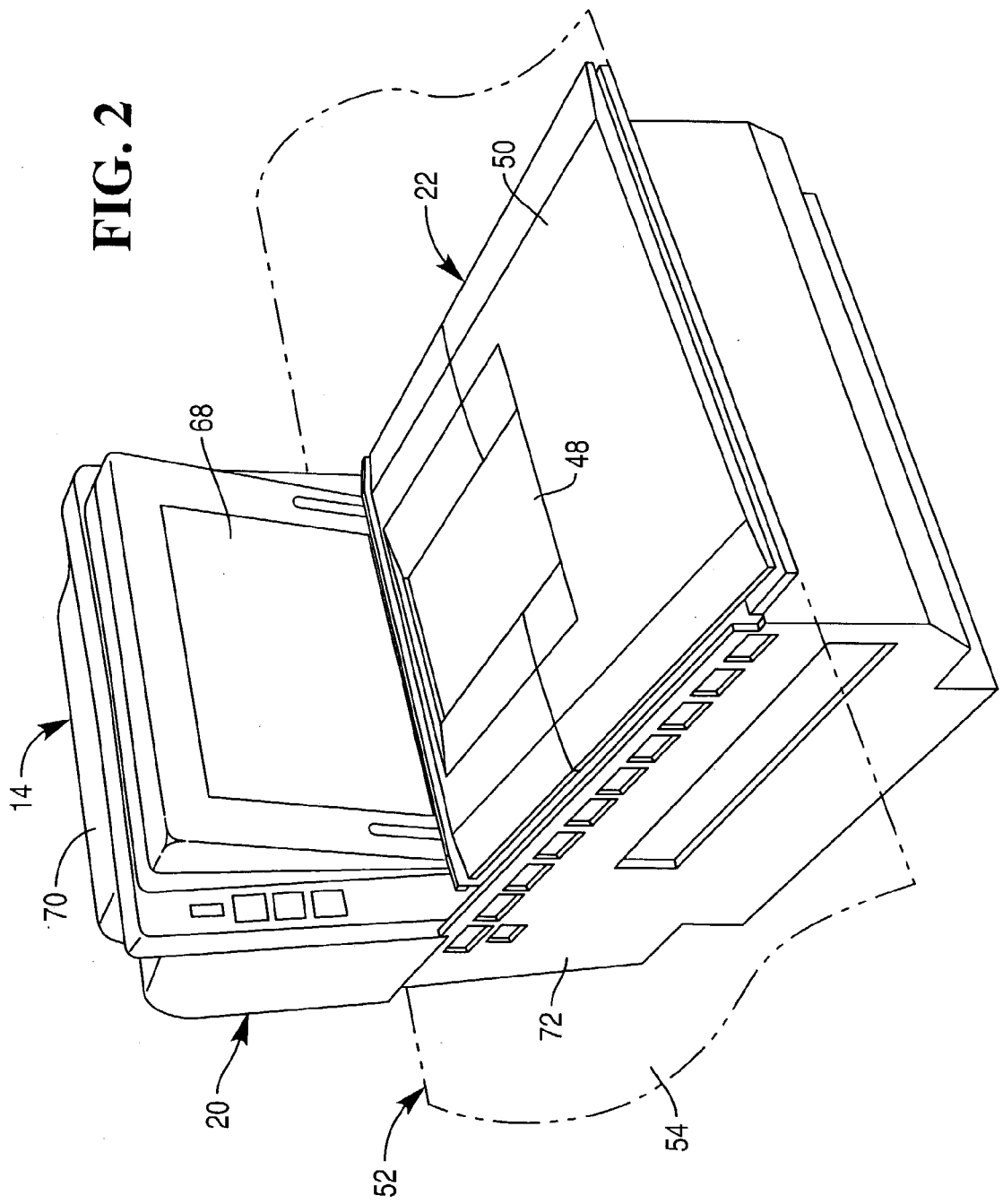
FIG. 2 is a perspective view of a first embodiment of a checkout device.
Figure 3:
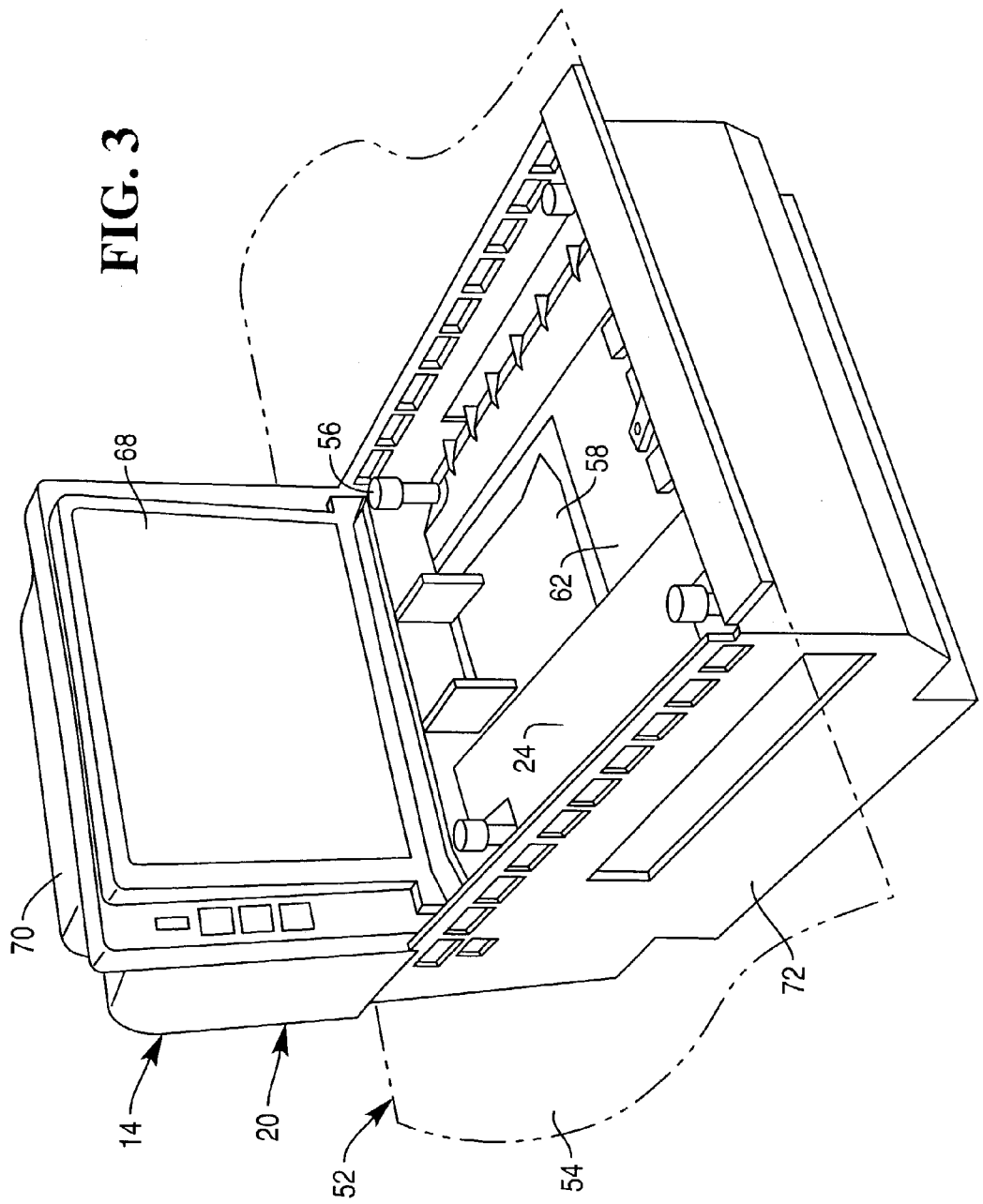
FIG. 3 is a perspective view of the checkout device of FIG. 2 with scale weigh plate removed.

Turning now to FIGS. 2–3, a first embodiment of checkout device 14 is shown in detail.

Checkout device 14 includes housing portions 70 and 72. Housing portions 70 and 72 contain optical components for barcode reader 20. Housing portion 70 includes vertical aperture 68 through which scanning light beams pass.

Checkout device 14 is preferably about 11.5 inches in width by 20 inches in length so as to fit within a "standard" U.S. checkstand hole for combination barcode reader and scale assemblies.

Housing portion 72 includes a load cell assembly and weigh plate 50 of scale 22. Weigh plate 50 includes horizontal aperture 48 through which scanning light beams pass. Housing portion 72 is mounted within checkout counter 52 so that weigh plate 50 is substantially flush with top surface 54 of checkout counter 52.

Checkout device 14 generates a plurality of laser scanning beams from the horizontal and vertical apertures 48 and 68. Laser scanning beams define a scan volume, in which a barcode is likely to be read by checkout device 14.

With reference to FIG. 3, the first embodiment of checkout device 14 has EAS system 24 mounted on top surface 62 of housing portion 72. Posts 56 support weigh plate 50 above EAS system 24 so as to provide an additional space to locate EAS system 24. Checkout device 14 is about two inches deeper than the NCR model 7875 checkout device in order to accommodate installation of EAS system 24.

EAS system 24 may slightly overlap aperture 58 from one side of aperture 58 without substantially interfering with the operation of barcode reader 22. Aperture 58 is in line with aperture 48 of weigh plate 50.

An example EAS system 24 includes electromagnetic coil 60. Coil 60 may include separate sense and deactivation coils. Corresponding security labels on products preferably include magnetic material. Coil 60 is packaged into a generally rectangular three-dimensional shape of insulating plastic.

Coil 60 is preferably oriented so that its length dimension is oriented perpendicular to the direction of product movement. In this way, security labels are exposed to the electromagnetic detection and deactivation fields from coil 60 after they are moved across aperture 48 of weigh plate 50.

The illustrated example shows EAS system 24 in a left side of housing portion 72 and left of horizontal aperture 58. The example is suitable for a right-to-left scanning motion. EAS system 24 may instead be located on a right side of housing portion 72 for left-to-right scanning.

Item 38 is moved across weigh plate 50. Barcode reader 20 reads barcode label 42 and sends an enable signal to interlock 26. Interlock 26 signals EAS system 24 to detect security label 40.

Under ideal conditions, coil 60 senses the magnetic material in security label 40 and demagnetizes the magnetic material in security label 40. However, item 38 may be passed through the scan volume of barcode reader 20 at a location which is sufficient for checkout device 14 to recognize a barcode label on item 38, but which is insufficient for EAS system 24 to detect and deactivate security label 40. One location at which detection and deactivation capability is reduced is high in the scan volume near the vertical aperture. This gap in coverage is caused by the differences in size and shape of the security label detection field and the scan volume.

Figure 4A:
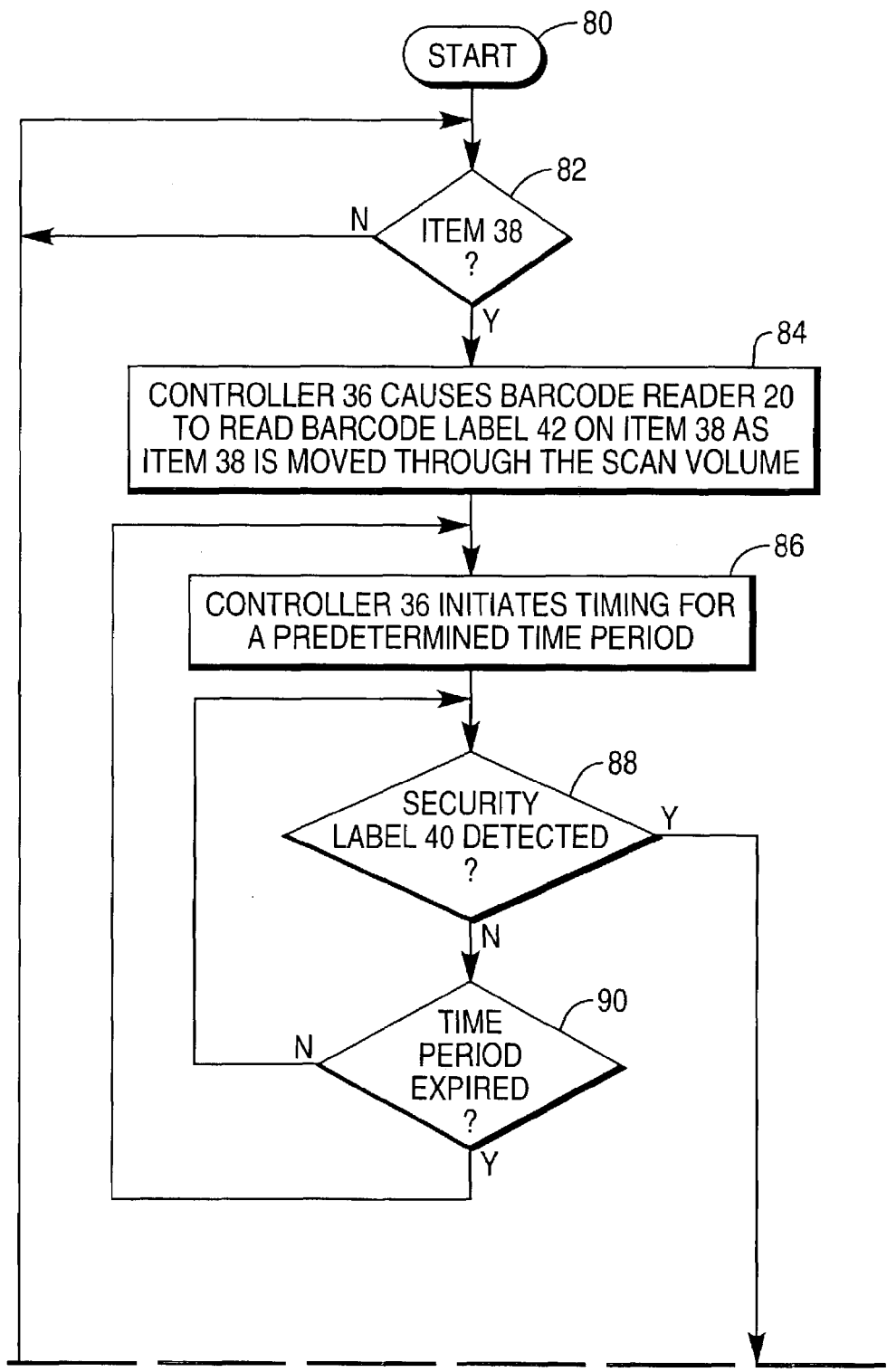
FIG. 4 is a flow diagram illustrating a method of detecting and deactivating a security label in accordance with the first embodiment.
Figure 4B:
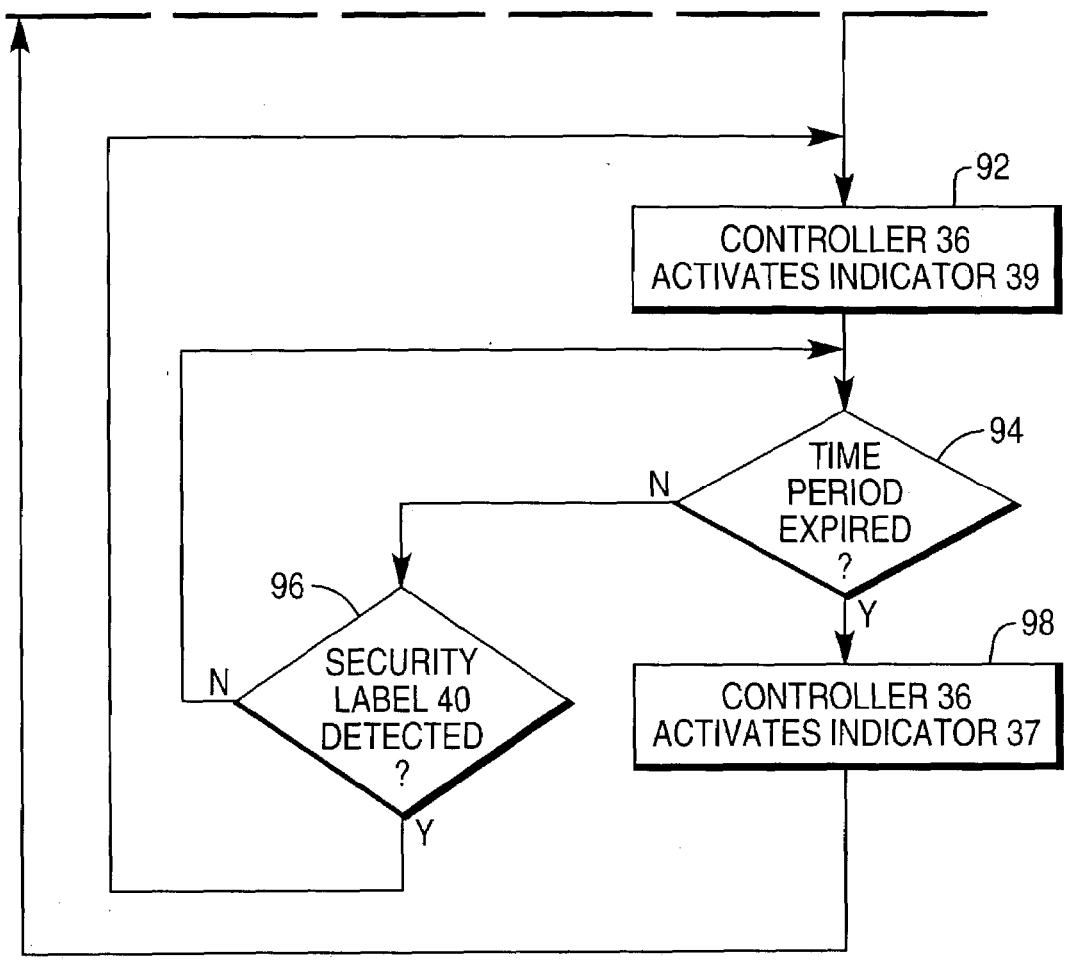

With reference to FIG. 4, a method of detecting and deactivating security labels 40 in accordance with a first embodiment improves detection capability for multi-aperture barcode readers, such as barcode reader 20. The method begins with START 80.

In step 82, controller 36 waits for item 38.

In step 84, controller 36 causes barcode reader 20 to read barcode label 42 on item 38 as item 38 is moved through the scan volume.

In step 86, controller 36 initiates timing for a predetermined time period. During this time period, an operator moves item 38 throughout the scan volume trying to get positive feedback in the form of a beep or flash of light from checkout device 14.

In step 88, controller 36 determines whether security label 40 has been detected. If not, operation proceeds to step 90. Otherwise, operation proceeds to step 92.

In step 90, controller 36 determines whether the time period has expired. If not, operation returns to step 88. Otherwise, operation returns to step 86.

In step 92, controller 36 activates indicator 39 to produce a clicking noise signaling detection of security label 40.

In step 94, controller 36 determines whether the time period has expired. If not, operation proceeds to step 96. The customer thinks that barcode label 42 has not been decoded and continues to move item 38 throughout the scan volume. Otherwise, operation proceeds to step 98.

In step 96, controller 36 determines whether security label 40 has been detected. If not, operation proceeds to step 94 to continue waiting for time to expire. Otherwise, operation proceeds to step 92 to activate indicator 39. Controller 36 activates indicator 39 each time security label 40 is detected.

After the time period expires, operation proceeds to step 98.

In step 98, controller 36 activates indicator 37 to produce a beep and colored light signaling decoding of barcode label 42 to the operator.

Operation returns to step 82 to wait for the next item 38.

With reference to FIG. 5, a method of detecting and deactivating security labels 40 in accordance with a second embodiment begins with START 100.

In step 102, controller 36 waits for item 38.

In step 104, controller 36 causes barcode reader 20 to read barcode label 42 on item 38 as item 38 is moved through the scan volume.

In step 106, controller 36 instructs EAS system 24 to temporarily increase the size of the detection field to larger than the scan volume in order to increase the likelihood that EAS system 24 would detect and deactivate security label 40, particularly when item 38 passes high above coil 60.

In step 108, controller 36 determines whether EAS system 24 detects a security label 40 on item 38. If so, operation proceeds to step 110. Otherwise, operation proceeds to step 118.

In step 110, controller 36 sets a flag.

In step 112, controller 36 instructs EAS system 24 to deactivate security label 40.

In step 114, controller 36 removes the flag.

In step 116, controller 36 instructs EAS system 24 to decrease the detection field to normal size.

In step 118, controller 36 activates notification device 37.

In step 120, operation returns to step 102 to wait for another item 38.

Figure 6:
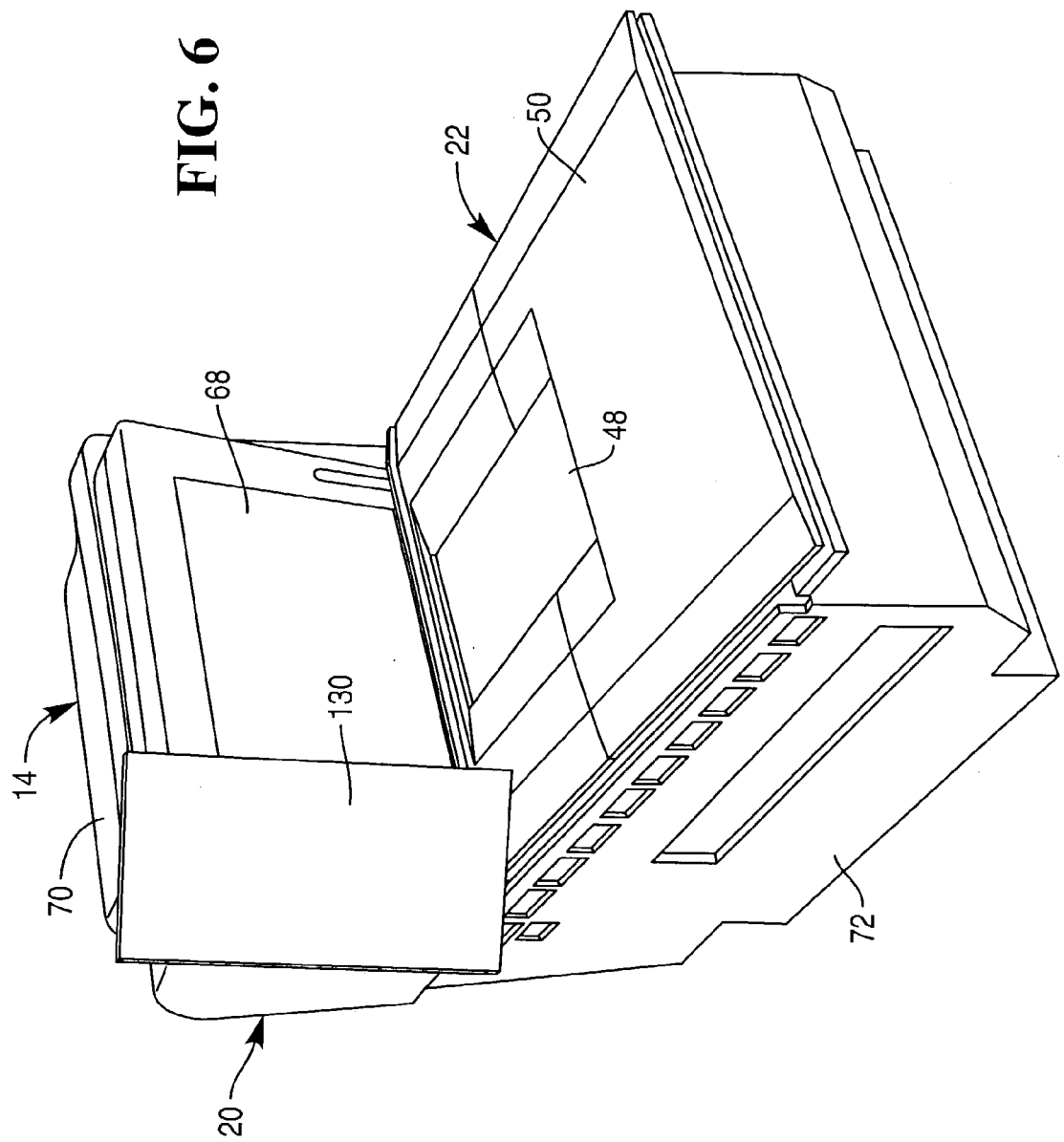
FIG. 6 is a perspective view of a third embodiment of the checkout device.

With reference to FIG. 6, a third embodiment of checkout device 14 provides an alternate solution for detecting and deactivating security labels 40 which are high enough above coil 60 to reduce the likelihood of being detected.

In addition to coil 60, the second embodiment adds a second coil 130. Coil 130 is oriented vertically on a left side of housing portion 70.

Although the invention has been described with particular reference to certain preferred embodiments thereof, variations and modifications of the present invention can be effected within the spirit and scope of the following claims.

What is claimed is:

1. A checkout device comprising:
    a barcode reader having substantially horizontal and vertical apertures for reading a barcode label on a product; and
    a security label sensing and deactivation system for deactivating a security label on the product including a coil, wherein the coil includes a housing below and adjacent to one side of the horizontal aperture;
    wherein the security label sensing and deactivation system has a first range of operation;
    means for increasing the first range of the security label sensing and deactivation system to a second range in order to sense and deactivate security labels positioned a predetermined height above the horizontal aperture; and
    means for notifying an operator that the barcode label has been read and that the security label has been deactivated.

2. The device of claim 1, wherein in the one side is downstream of a scanning motion across the horizontal aperture.

3. A checkout device comprising:
    a barcode reader having substantially horizontal and vertical apertures for reading a barcode label on a product; and
    a security label sensing and deactivation system for deactivating security labels on the products as the barcode labels are being read by the barcode reader including a coil, wherein the coil includes a housing below and adjacent to one side of the horizontal aperture for sensing and deactivating first security labels within a predetermined distance of the coil;
    means for temporarily increasing the distance for sensing and deactivating second security labels outside the predetermined distance of the coil; and
    means for notifying an operator that the barcode label has been read and that the first and second security labels have been deactivated.

4. A checkout device comprising:
    a barcode reader having substantially horizontal and vertical apertures for reading barcode labels on products, wherein the barcode reader produces a scan volume within which the barcode reader is configured to read the barcode labels; and
    a security label sensing and deactivation system for deactivating security labels on the products as the barcode labels are being read by the barcode reader including
        a first coil including a housing below and adjacent to one side of the horizontal aperture for sensing and deactivating first security labels within a predetermined distance of the first coil;
        means for sensing and deactivating second security labels adjacent the vertical aperture and higher than the predetermined distance above the first coil; and
    means for notifying an operator that the barcode label has been read and that the first and second security labels have been deactivated.

5. A checkout method comprising the steps of:
    reading a barcode label on an item by a barcode reader having substantially horizontal and vertical apertures for reading a barcode label on the item;
    boosting a security label detection field of a security label sensing and deactivation coil having a housing below and adjacent one side of the horizontal aperture from a first range to a second range higher than the first range above the horizontal aperture;
    deactivating a security label on the item;
    reducing the security label detection field from the second range to the first range; and
    activating a notification device.

6. A checkout method comprising the steps of:
    reading a barcode label on an item;
    preventing activation of a device for notifying an operator that the barcode label has been read until successful deactivation of a security label on the item;
    boosting a security label detection field from a first range to a second range;
    deactivating the security label on the item;
    reducing the security label detection field from the second range to the first range; and
    activating the notification device to indicate that both the barcode label has been read and the security label has been deactivated.

* * * * *